United States Patent [19]
Crookham et al.

[11] Patent Number: 6,016,389
[45] Date of Patent: Jan. 18, 2000

[54] APPARATUS AND METHOD FOR LIGHTING LARGE AREAS FOR TELEVISION

[75] Inventors: Joe P. Crookham, Oskaloosa, Iowa; William E. Brackett, Boulder, Colo.; Mark A. DeJong, Albia; David L. Barker, Ottumwa, both of Iowa

[73] Assignee: Musco Corporation, Oskaloosa, Iowa

[21] Appl. No.: 08/854,012

[22] Filed: May 8, 1997

Related U.S. Application Data

[60] Provisional application No. 60/017,494, May 9, 1996.

[51] Int. Cl.$^7$ ........................................ G06F 9/455
[52] U.S. Cl. .............................. 395/500.01; 395/500.25
[58] Field of Search ........................ 364/512, 578; 395/500, 500.34, 500.24, 500.25, 500.26, 500.39; 362/259, 463; 359/478

[56] References Cited

U.S. PATENT DOCUMENTS

| | | | |
|---|---|---|---|
| 4,339,789 | 7/1983 | Husby et al. | 362/259 |
| 4,450,507 | 5/1984 | Gordin | 362/463 |
| 5,559,632 | 9/1996 | Lawrence et al. | 359/478 |

*Primary Examiner*—Kevin J. Teska
*Assistant Examiner*—Dan Fiul
*Attorney, Agent, or Firm*—Zarley, McKee, Thomte, Voorhees & Sease

[57] ABSTRACT

An apparatus and method of evaluating lighting for a given target area that will have an event which is televised. The method includes calculating television foot-candle and vertical foot-candle for various points on the target area as well as calculating the ratio between those two readings. These calculated readings can then be evaluated for the purpose of determining whether sufficient uniformity and intensity exists for given aiming locations on the target area to provide high quality television filming. The apparatus is preferably a computer program that is installed on a computer that would allow both simulations of not yet existing lighting systems to design lighting systems for optimum television coverage or evaluate existing lighting systems to change them for better performance for televising.

27 Claims, 5 Drawing Sheets

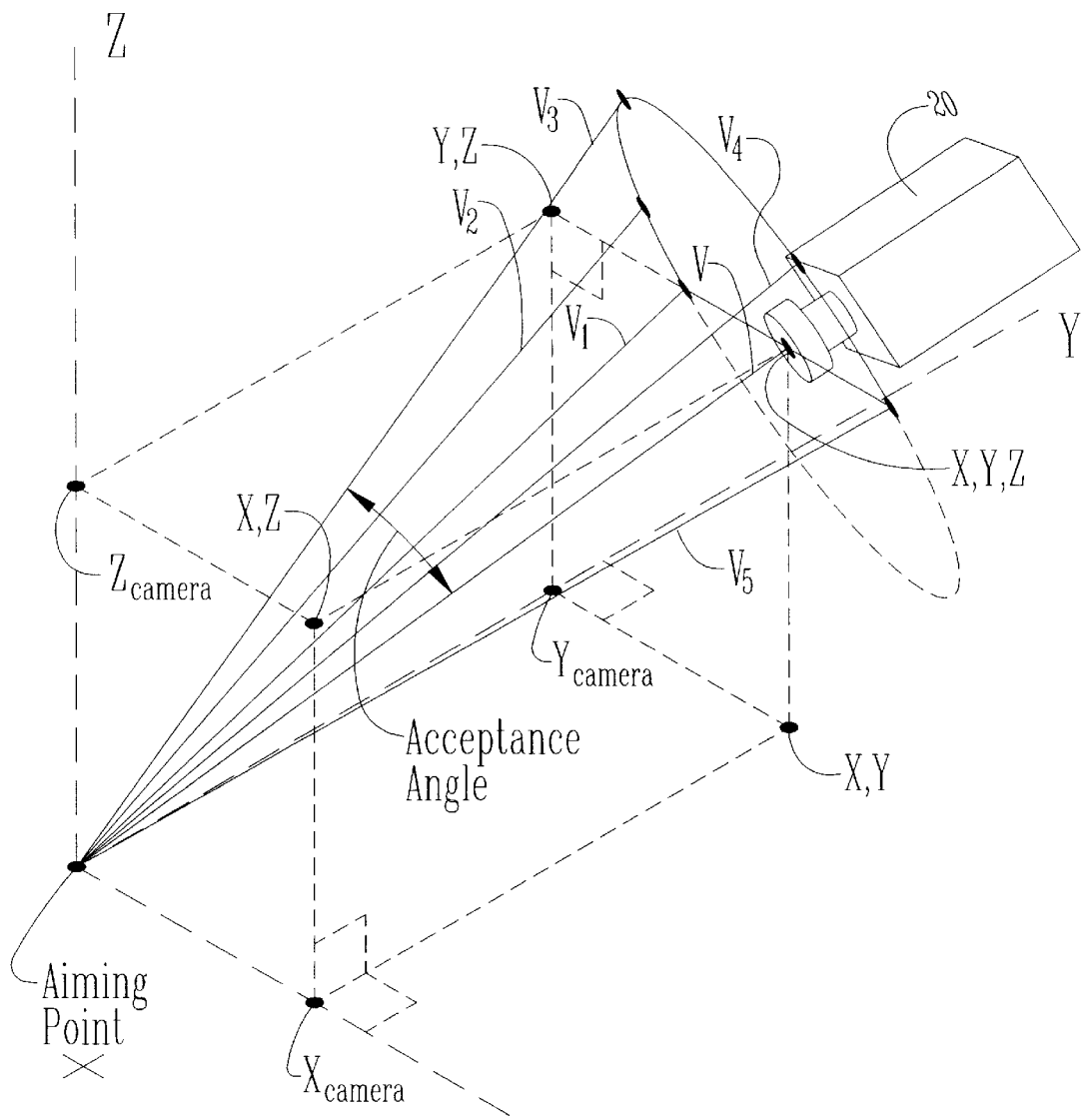
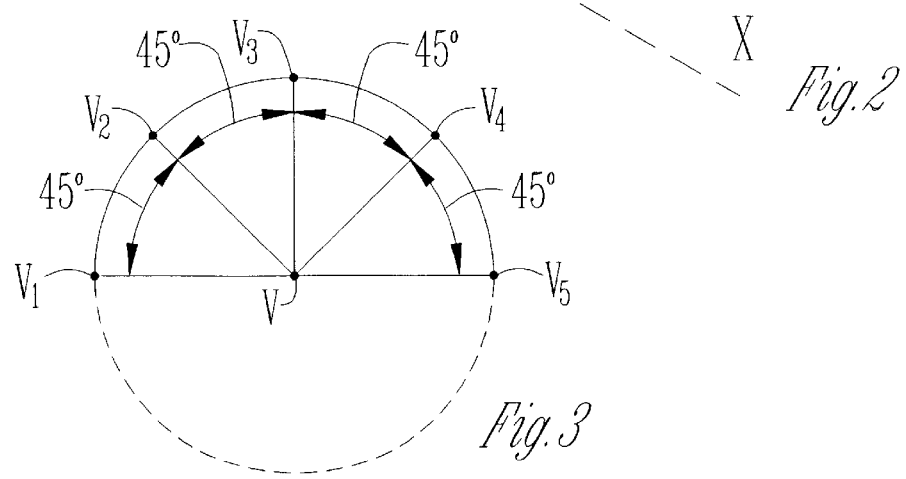
Fig.2
Fig.3

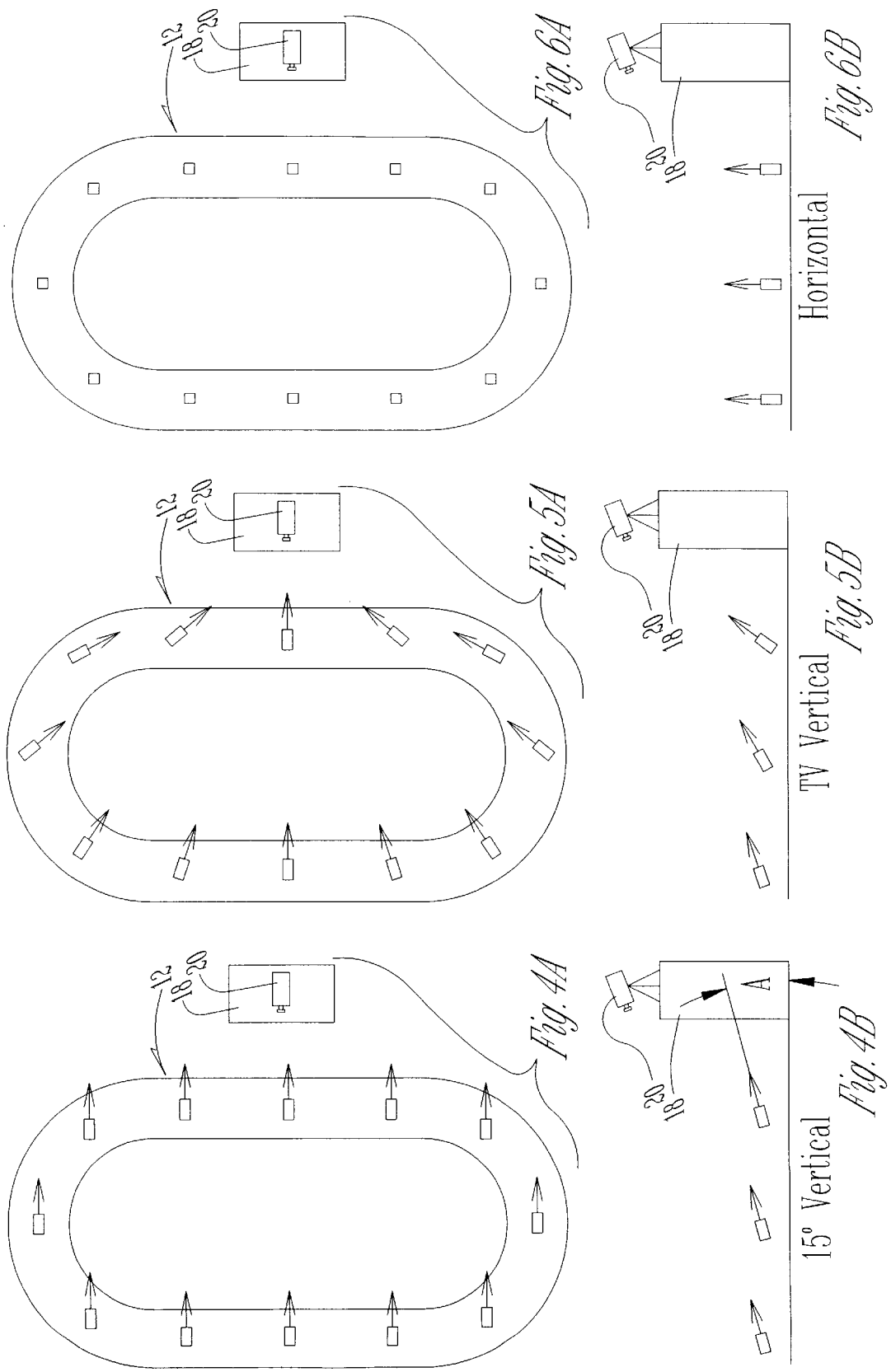

APPARATUS AND METHOD FOR LIGHTING LARGE AREAS FOR TELEVISION

This application claims the benefit of U.S. Provisional Application(s) No(s).: application Ser. No. 60/017,494 FILING DATE May 9, 1996.

BACKGROUND OF THE INVENTION a. Field of the Invention

This invention relates to apparatus and methods of lighting large areas for television or film, and in particular, to apparatus and methods for simulating and/or predicting the lighting characteristics that will occur and/or are occurring in the view of any particular camera location, in order to better design the lighting for the large area for the benefit of televising or filming events there, or giving feedback to the camera persons regarding the way to operate the camera to get the best quality recording.

b. Problems in the Art

Televising live sporting events has become big business. However, lighting which is sufficient for the athletic event may not be sufficient for a very good televised picture of the event. In other words, a well designed lighting system in terms of uniformity and intensity of light for a particular application, may not result in optimal filming or televising of events using the lighting system for available camera locations. Adjustments in the otherwise well-designed lighting system could maintain good uniformity and intensity but improve the recording of an event for television or film.

Many sports facilities are now being constructed with lighting specifically designed for good quality television. Whether a new facility and new lighting is being designed or whether an existing facility with existing lighting is being analyzed, the lighting designer, the camera operator, or the director of the televised event, generally wants the best lighting for television. The same is true for film.

Currently one common method for determining the best television lighting is to utilize an oscilloscope hooked up to the camera. By methods known in the art, this oscilloscope will tell the camera operator whether lighting is sufficiently uniform for its field of view and location or whether there are some high or low luminance spots which must be contended with by either changing the aperture of the lens of the camera, manipulating the picture electronically in the production trailer, or if possible altering the lighting at the facility.

It is important to understand that this must take place while the lighting is turned on and the camera is running. Additionally, the frame of reference of the oscilloscope is the view of the camera, i.e., along the axis of the camera to the point it is pointing to a playing field.

SUMMARY OF THE INVENTION

It has been found to be a need the art and that it would be very beneficial to predict whether lighting would be sufficiently uniform for a camera location and viewing direction for the camera, rather than actually setting the camera up, turning the lighting on, and measuring on the fly. The owner of the present invention manufactures lighting systems for various types of sporting arenas or stadiums. Moreover, they and others have developed computerized programs which help them design lighting layouts to achieve a particular uniformity of lighting across the playing field. These programs are widely known and used in the art. The program either knows, or will tell where lights should be placed and how they should be aimed. It furthermore understands what the level of light will be point to point across and above the playing field. A term by which a type of these sorts of programs is known is "point by point" analysis of a target area, such as an athletic field. Examples are found in the widely known and published IES (Illuminating Engineers Society) Sports Lighting Manual, which is usually published annually.

The present invention, in one embodiment, utilizes a computer program which will be told the location (distance, height, etc.) of the camera relative to the playing field, and then will utilize that information (including the aiming direction of the camera) with the information it will know about the particular lighting system being suggested, to simulate the luminance the camera will see for a number of camera views. In other words, it will integrate the information it knows about the lighting system and the light the lighting system creates, with the camera location and aiming direction to essentially tell the camera operator whetherthere will be sufficient level of uniformity of luminance for that camera location and aiming direction.

The invention offers the further enhancement of not solely relying on a simulated measurement directly along the axis of the camera to the playing surface, but also takes into account the simulated measurements at various points around the playing surface (in other words the camera generally will turn its aiming direction to various parts of the playing field and even to other parts of the building or stadium, such as towards spectators). Still further, as illustrated by the half of the cone in the accompanying FIG. 2, simulated luminance readings can be taken at points off of the axis between the camera and the particular target spot on the playing surface. This helps because it has been discovered that the camera will be affected not only by luminance along that axis, but off of that axis.

Therefore the invention allows a lighting designer to understand any potential problems for televising an event at a location even before the arena and the lighting system have been built. It is also of course useful if the arena and lighting system are presently existing. It could tell how the lighting could be changed and modified to improve the lighting for television or for other reasons.

BRIEF DESCRIPTION OF THE DRAWINGS

Accompanying this disclosure are drawings as follows:

FIG. 2 is a diagrammatic depiction of the television camera of FIG. 1 as defined in a coordinate system having its origin at one of the aiming points of FIG. 1 and having projected lines from the origin to several points spaced apart on a semi-circle having the camera as its center point, the projected lines forming a half of a cone.

FIG. 3 is an elevational view of the semi-circle of FIG. 2.

FIGS. 4A and B, 5A and B, and 6A and B are diagrammatic plan views and elevations of the track and camera of FIG. 1 but showing different ways of measuring light intensity at different aiming points around the track.

DETAILED DESCRIPTION OF AN EXEMPLARY EMBODIMENT OF THE INVENTION

To provide a better understanding of the invention, preferred embodiments will now be described. Frequent reference will be taken to the accompanying Figures. Reference letters and numbers will be used to point out certain parts or locations in the Figures. The same reference letters or numbers will be used to refer to the same parts or locations throughout all of the Figures, unless it is otherwise stated or indicated.

Figure 1:
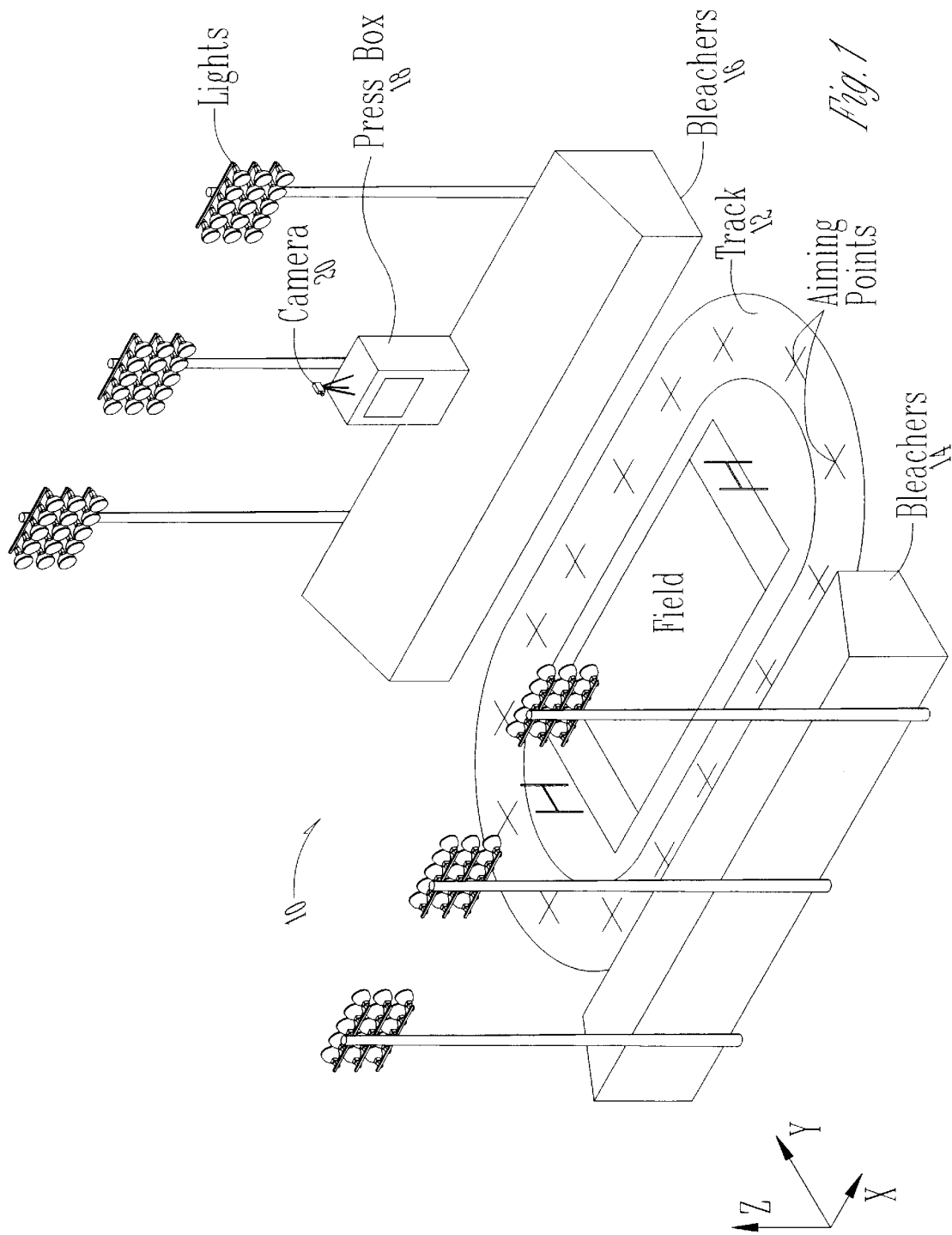
FIG. 1 is a diagrammatic perspective view of a stadium having a lighting system and an elevated structure (e.g. press box) upon which can be placed a television camera; the stadium including a running track with aiming points for the camera depicted around the track.
Figure 7:
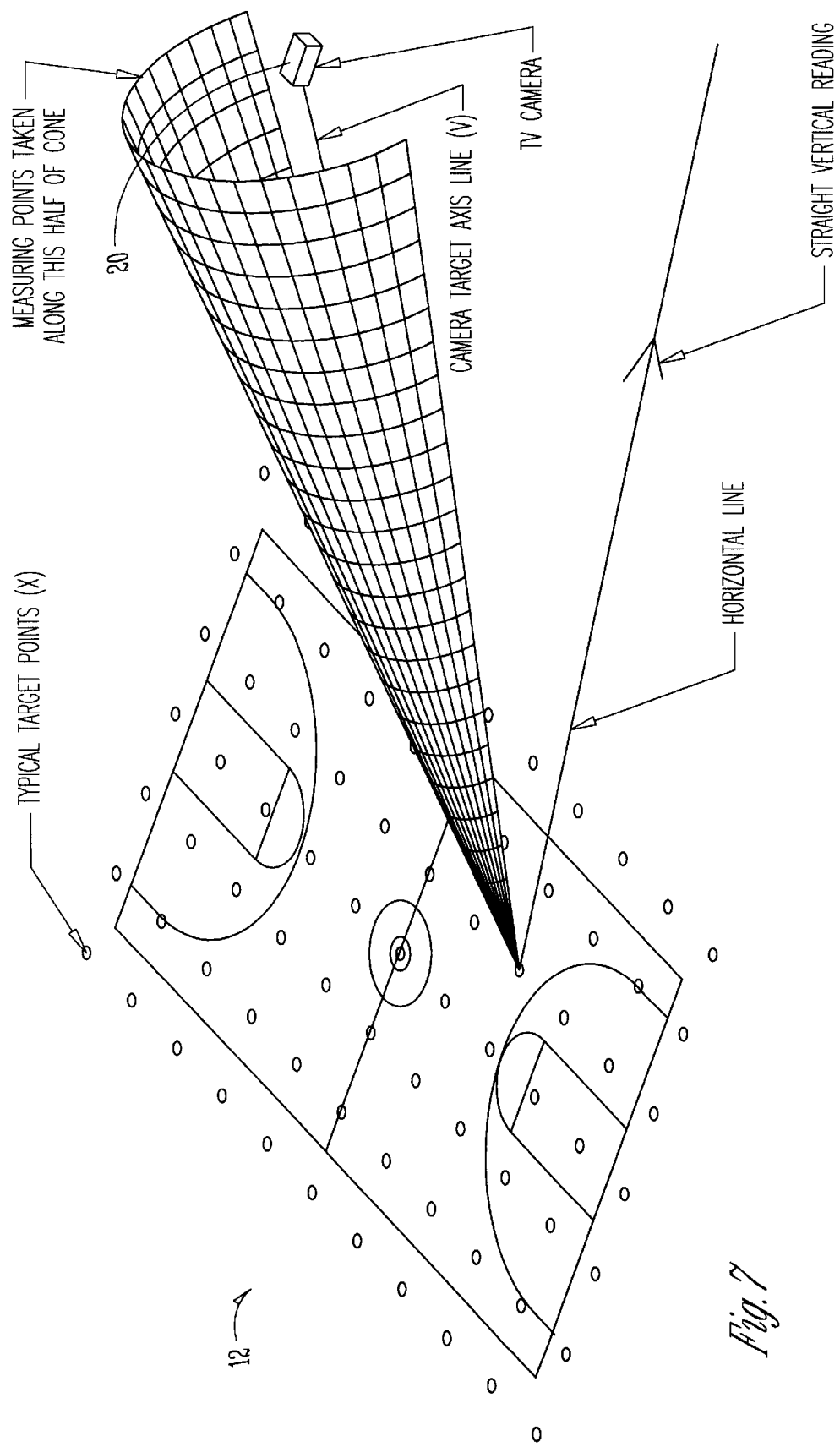
FIG. 7 is similar to FIG. 2 but shows projected lines from an aiming point on a basketball court to a semi-circle around a camera.
Figure 8:
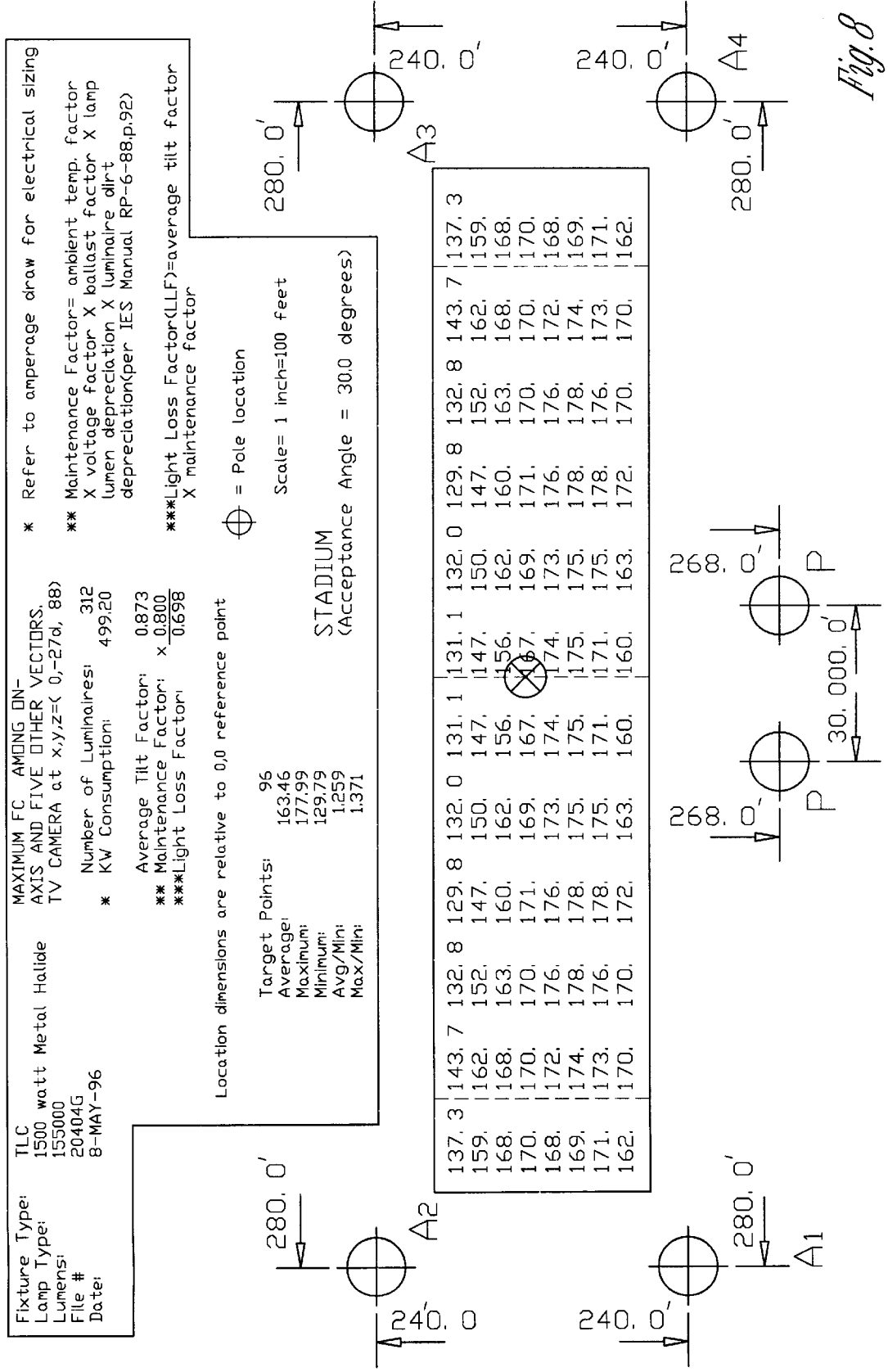
FIG. 8 is a report that could be generated according to the invention showing light levels and other information on a football field relative to a camera position.

Light levels are very important with respect to television cameras. FIG. 1 shows an example of a stadium 10 including a 400 meter running track or field 12 and spectator bleachers 14 and 16. In FIG. 1, a television camera 20 is shown elevated above the track 12 on the press box 18. Other cameras could be positioned at other locations. If the event is televised in daylight, information can be obtained regarding light levels at the field by taking light meter readings at various points around the field 12 at a similar time of day and year to the television event. It is also important to know the angle of the sun relative to the field and to each camera.

There are presently known methods whereby equipment is used in association with each television camera to attempt to measure light levels in real time according to what the camera has in its view. One such piece of equipment utilizes an oscilloscope to give a reading to the camera operator that he or she can translate into light level readings.

If an event is televised at night, it is even more important to have information regarding light levels. Because the field will not be illuminated by the sun but by artificial lighting, this is important not only to get sufficient light for television, but also for definition and color rendition. Utilization of the oscilloscope system allows some evaluation of light levels for different aiming angles of the cameras. However, it requires testing to be done once the cameras are in position. Remedial action thus must be done once the cameras are in position and the lighting is on. Such remedial action may to too late or too little. Also, the oscilloscope method does not lend itself to simulation of lighting situations.

The alternative, namely taking multiple light meter readings along a vector between each aiming point and the camera position is labor intensive. It therefore has been found that a better way to estimate lighting conditions for given camera locations for a given stadium or other location was needed. Furthermore, it was discovered that a way to simulate lighting for a particular location and then estimate what the camera would view for a given aiming location was needed.

The following is an outline briefly defining some of the technical details of the current invention which is identified under the trademark "O-Scope".

This invention derives its name from the electronic device "oscilloscope" which is commonly utilized by professionals filming sporting and other televised events.

Oscilloscope is defined by Merriam-Webster as follows: os*cil*lo*scope: instrument showing variations in electrical quality as a wave on a fluorescent screen.

An oscilloscope receives electrical signals and it is utilized to measure and record peak to peak voltage and the related time duration along with other related options which differs slightly from model to model depending on its anticipated usage. Probably the most common use of this device is in the research and testing of electronic equipment. Oscilloscopes have also been utilized in the fields of seismology and medicine.

A television camera adjusts to the highest luminance in and around an axis line from the object being filmed to the camera location.

For quality television filming results, the luminance on the object being filmed must be as uniform as possible and the Video Professional has the capability to adjust the iris of the camera in efforts to enhance the video image but this enhancement is limited to a tolerable rate.

In the filming process the camera converts images into electronic signals and these signals can be monitored by an oscilloscope in order to graph out various in the intensities of luminance over an area being televised.

Luminance is a measurement of brightness which is proportional to the quantity of illumination on the object.

Just as an oscilloscope informs the Video Professional of the uniformity over an area being televised the O-Scope® program was developed to analyze and illustrate the illuminance intensities and variances on televised lighting projects.

The O-Scope™ program simulates the analysis process of an oscilloscope by utilizing lighting fixtures' computer photometric files (computer files that are prepared based on previously developed information regarding the lighting fixtures to be used with the lighting system—this photometric information, and how it is developed, is well known in the art). Through mathematical calculations this program is capable of providing the following information in a report form to the Lighting Designer:

records the maximum illuminance between on-axis to the camera and five other defined vectors which are located in the upper 180° portion of the cone (see FIG. 2).

records the straight vertical illuminance with meter direction the same azimuth of the camera to the target point.

ratios maximum illuminance/straight vertical illuminance.

It is possible to understand what type of lighting levels will exist for a given design of a lighting system even prior to it being installed and tested. By understanding the light output of the lighting fixtures that are selected, their locations relative to the field being lighted, and an understanding of how multiple lights compositely interact can be put together according to the invention and a computer can produce an output which tells what sort of light levels exist at all points across the field.

After having defined the light levels, locations of the lighting, the location and aiming angles towards the field of a desired camera position can be input into computer.

FIG. 1 illustrates a number of aiming points X along the track as examples only. The camera 20 is elevated above the field 12 approximately aligned with the center of the track field 12.

The method of the invention utilizes what will be called "TV vertical foot-candles" analysis, as distinguished from the "vertical foot-candles" analysis (flat plane analysis) described below.

Horizontal foot-candles: This is the light level reaching a horizontal plane. To take horizontal level readings, the light meter would be oriented with the sensing surface pointing upward. The horizontal foot-candle values are indicative of the quality of appearance of a playing surface to spectators and players. This analysis is not indicative of the appearance of objects (players, ball, etc.) on the playing surface.

Vertical foot-candles (flat plane analysis): This is the light level reaching a surface that is perpendicular to the axis from a TV camera. To take vertical light level readings, the light meter would be oriented with the sensing surface pointing toward the TV camera. TV vertical foot-candle values are indicative of the quality of appearance of a playing field and objects on the field (player, ball, etc.) to the TV camera. However, this analysis method describes how flat surfaces, positioned perpendicular to the cameras axis, would appear. It does not account for the fact that real objects on a playing field consist of variable curved surfaces, and variable orientations to the camera axis.

TV Vertical foot-candles ("O-Scope analysis"). The O-Scope analysis method of the invention better predicts the quality of appearance for the TV cameras, or real, curved surfaces. In this analysis method, multiple light readings are taken, on or near the camera axis. The maximum of these values is saved and reported. The numbers are then indicative of how the cameras will respond to curved objects on the playing field.

The theory of the method of the invention involves having knowledge in free space of the location of the T.V. camera (i.e., its X, Y, Z position) in a coordinate system where X and Y define the plane of the field and Z defines vertical elevation (see FIG. 2 where this is diagrammatically depicted—the relative distance between camera 20 and aiming point X on the field 12 are compressed for purposes of illustration).

Each of the aiming points X can then be placed within the XY plane.

By referring to FIG. 2, a vector V can be established between the aiming point X and the camera. What is called an "acceptance angle" is selected. The acceptance angle is ultimately the angle formed between vector V and the perimeter of a cone created around vector V with aiming point X as the apex of the cone.

As set forth at numbered paragraph 3 of the example below, a 10° acceptance angle would form a tight cone whereas a 45° acceptance angle would result in a quite broad cone.

Five additional vectors, V1, V2, V3, V4, and V5 are established as shown in FIG. 2. The intersection of vectors V1–V5 with the circle around the position of the camera is shown in FIG. 3. Each of the points is 45° apart.

A value called "A" is established. This value is the greatest light level value for each of points V and V1–V5.

A second value "B" is calculated according to the steps described below.

In the preferred "OSCOPE" program, the program computes simulated "oscilloscope" illuminance, values A, B, and A/B, which may be calculated according to these steps:

1. Take a camera location and target point.

2. Let V be the vector from the target point to the camera (see FIG. 2).

3. Imagine a cone surrounding V, which its apex at the target point (see FIG. 2). The axis of the cone is then the vector V. Let the breadth of the cone be specified by the "Acceptance Angle". A 10° acceptance angle would result in a tight cone, while a 45° acceptance angle would result in a broader cone, etc.

4. Ignoring that 180° portion of the cone which lies beneath V, generate five additional vectors which project from the target point, which lie in the cone, and which are equally spaced over the half-cone (see FIG. 2). If we cut the cone with a plane normal to V, then the intersection region of interest is a half-circle centered at V (see FIGS. 2 and 3). If we look where each of the five additional vectors intersect this half-circle, the intersection points will be 45° apart on the half-circle.

5. A "TV foot-candle" calculation is made for the six meter orientations taken at a target point which correspond to V and the five additional vectors (see FIG. 3). The greatest of these six calculated foot-candle (fc) values is designated as value A.

6. An additional "TV foot-candle" calculation is made at the target point, for an imaginary camera. The (x, y, z) coordinates of this imaginary camera are (X, Y, Z), where X, Y are the x, y coordinates of the actual camera, and where Z is the z coordinate of the calculation grid points. In other words, the line of sight from the target point to the imaginary TV camera is the same as the line of sight to the actual camera, except that it is projected onto the horizontal plane which contains the target points. Therefore this calculation is a straight vertical fc, with the meter direction determined by the azimuth of the TV camera related to the target point. The vertical fc so calculated is designated as value B.

7. The results reported for each target point are A, B, and the ratio A/B.

These are the properties of the program:

a) To run under VMS, key in OSCOPE (the name of the program according to the present invention) at the VMS $ prompt.

b) You will be prompted for both input and output files.

c) The program expects an input file (with predetermined photometric information as discussed above) with one or more TV camera grids defined on 'TV' lines. However, if there are no TV lines, you will be given the opportunity to key in an x, y, z camera location. If there is more than one TV line in the input file, the program will list all the x, y, z camera locations from the file and ask you to pick one.

d) You will be prompted for the "acceptance angle". Note that this is the angle between the on-axis vector to the camera and the edge of the cone which contains the additional five vectors. The acceptance angle is not the total angular width of the cone; it is one-half that width.

By referring to FIGS. 5A and B, the "T.V. vertical" value of B is illustrated. The drawings to the left (FIGS. 4A and B) and right (FIGS. 6A and B) of the middle "T.V. vertical" drawings of FIGS. 5A and B are other types of light meter orientations (horizontal foot-candles and 15° vertical foot-candles) described above.

Once values A and B are calculated for each target point, the ratio of A to B for each target point is also calculated.

It is to be understood that by having a knowledge of what the lighting levels will be for a given lighting system (which is known and within the skill of those skilled in the art) and knowing the camera position in free space, values A and B and the ratio A/B can be calculated by a computer even though the system has never been built and the camera has never been put into position. Values A, B, and A/B for each aiming location allow the computer to predetermine for each camera viewing direction what the light levels will be. This would allow the camera operator to adjust the aperture of the camera if needed to pull in more light or to decrease light, and it also allows the camera operator to know what sort of light level problems there might be if a close-up is taken from that viewing angle or if a wide angle shot is taken.

The invention, especially when utilized with a computer, thus allows a lot of information to be used to essentially simulate a lighting system and camera performance before either is ever installed. It can help select television camera locations and it also allows such things as changing of the variables (such as the amount of lights, their locations, etc.) to change the design of the lighting system and see how that would affect camera lighting factors, etc.

It is to be further understood that the method could be accomplished manually. Meter readings to establish values A and B could be taken at the various aiming points for the given camera location when the lighting is turned on. Therefore, the invention in its broadest form includes the steps of gathering the needed data to calculate A and B regardless of whether it is done by computer program or manually or some other method. The manual method may have more margin of error because it is difficult to get consistent meter readings and get precise aiming of the light meter to calculate A and B.

It will be appreciated that the present invention can take many forms and embodiments. It is not intended that the embodiments of the invention presented herein should limit the scope thereof.

It can be seen that the present invention allows one to predict the lighting to provide or meet the requirements of lighting for TV. It can be done with existing systems using a computer program according to the above described methodology and/or by taking manual light meter readings according to the method of the invention, or can be used to plan lighting systems or plan positioning of television cameras. It can also simulate characteristics of an existing or theoretical lighting system based on a series of simulated or actual readings of intensity at selected angles or based on input regarding computer selected locations and information. The analysis can predict if an actual or theoretical lighting system will provide required lighting for TV. It can also be used for predicting or selecting video equipment that will produce needed or desired results. The simulation allows one to predict in advance where cameras should be moved or installed and/or to select the type of equipment or its characteristics, and/or what lights are available to accomplish certain functions for the cameras, etc.

What is claimed:

1. A method of improving television lighting of a target area, comprising:
    obtaining television foot-candle readings for a plurality of camera aiming points on the target area;
    obtaining vertical foot-candle readings for the same plurality of aiming points on the target area;
    calculating the ratio of the television foot-candle and vertical foot-candle readings for each aiming point;
    reporting for each aiming point the television foot-candle, vertical foot-candle, and ratio; and
    based on the report, determining whether to adjust any of the following: a camera's position, a camera's operating characteristics, a camera's aiming, or lighting.

2. The method of claim 1 wherein the television foot-candle is the maximum reading selected from a plurality of points, including on-axis and off-axis relative to the camera and aiming point.

3. The method of claim 2 wherein an on-axis vector between the aiming point and a camera lens defines the on-axis television foot-candle and the other points are on the upper half of a cone surrounding the lens.

4. The method of claim 2 wherein the cone is defined by a acceptance angle with the aiming axis as the apex of the cone.

5. The method of claim 1 wherein the vertical foot-candle reading is determined by line of site of the camera projected to a horizontal plane containing the aiming point.

6. The method of claim 5 wherein the vertical foot-candle reading is determined by the azimuth of the camera.

7. The method of claim 1 wherein the television and vertical foot-candles and their ratios are used to design lighting, including placement, numbers, aiming angles, and beam types of lighting fixtures that will light the target area.

8. The method of claim 1 wherein the television and vertical foot-candles and their ratios are used to place one or more television cameras relative to the target area.

9. The method of claim 1 wherein the television and vertical foot-candles and their ratios are used to design television production of events at the target area.

10. The method of claim 1 wherein the television and vertical foot-candles and their ratios are used to modify existing lighting systems, including one or more of placement, numbers, aiming angles, and beam types of lighting fixtures used to light the target area.

11. The method of claim 1 further comprising loading of known lighting information regarding a simulated or existing lighting system for the target area into a computer, loading camera location and aiming point locations into the computer, calculating the television and vertical foot-candles and storing them in the computer; calculating the ratio of the television and vertical foot-candles and storing them in the computer; and issuing a report that can be evaluated based on the values and ratios.

12. The method of claim 1 wherein the readings are taken manually and the ratios are calculated, the readings and ratios then being recorded for evaluation.

13. A method of evaluating lighting at a target area relative to televising events during lighting by either a simulated or actual lighting system, comprising:
    establishing one or more camera locations relative to aiming points on the target area;
    establishing a vector V between an aiming point and the camera location;
    establishing a cone having an apex at the aiming point and centered on vector V and expanding at an acceptance angle measured between vector V and the cone;
    designating a plurality of cone vectors on the cone, each beginning at the aiming point and terminating in a plane normal to the intersection of vector V with the camera location;
    calculating television foot-candles at each of the points of intersection of the cone vectors with the plane and at the intersection of vector V and the plane;
    establishing the greatest television foot-candle value for any of the vectors;
    calculating straight vertical foot-candles at each of the points of intersection of the cone vectors with the plane and vector V and the plane;
    comparing the greatest television foot-candle, vertical foot-candle, and ratio of greatest television foot-candle and vertical foot-candle for the aiming point; and
    based on the report, determining whether to adjust any of the following: a camera's position, a camera's operating characteristics, a camera's aiming, or lighting.

14. The method of claim 13 wherein the cone vectors are equally spaced apart along a semi-circle in the plane of intersection, the semi-circle being above vector V.

15. The method of claim 13 further comprising establishing a plurality of vector V's and cones between the plurality of aiming point and the camera location.

16. The method of claim 15 further comprising establishing a plurality of vectors V and cones between the plurality of aiming points and the plurality of camera locations.

17. The method of claim 13 wherein the greatest television foot-candle, vertical foot-candle, and ratio of greatest television foot-candle and vertical foot-candle for one or more aiming points are used to design a lighting system for television production.

18. The method of claim 17 further comprising establishing where to put the television cameras.

19. The method of claim 17 further comprising establishing/adjusting the camera operation characteristics.

20. The method of claim 17 further comprising establishing/adjusting lighting characteristics for the target area.

21. The method of claim 17 further comprising simulating lighting and television camera performance for a given simulated or existing lighting system.

22. The method of claim 17 further comprising generating a report setting forth the greatest television foot-candle, vertical foot-candle and ratio of greatest television foot-candle and vertical foot-candle for one or more aiming points.

23. The method of claim 13 wherein the acceptance angle is selected based on the particular circumstances of the event to be televised.

24. The method of claim 13 wherein the acceptance angle is determined by the particular viewing angle of a camera relative to an aiming point.

25. The method of claim 13 wherein the television and vertical foot-candles are evaluated regarding quantity of light and direction of light for a given aiming point or plurality of aiming points for a given camera.

26. A method to simulate lumens seen by one or more cameras for different viewing angles relative to one or more points of a target area, comprising:

defining a 3-dimensional reference grid in a volume of space that includes a target area generally related to a plane in the space and at least one camera location above the plane in the space;

designing a lighting system for the target area, the lighting system including a plurality of light sources of known location relative to the space and light output characteristics, aimed to meet predetermined light intensity and uniformity requirements for the target area;

calculating point by point intensity and uniformity information across the target area based on the designed lighting system;

for a given camera location and a given point on the target area defining an aiming axis therebetween;

defining an acceptance angle between the given point and the camera by the angle between the aiming axis and a line beginning at the given point on the target area and a point in a plane perpendicular to the aiming axis at or near the end of the camera;

describing in the volume of space a circle having its center the aiming axis and its perimeter in a plane defined by the intersection of the aiming axis and the end of the camera, the circle comprising upper and lower semi-circles;

establishing a plurality of additional lines at the acceptance angle relative to the aiming axis but by defining equally spaced points of intersection on the upper semi-circle;

calculating the greatest light value at the camera location between the aiming axis and other points around the upper semi-circle and assigning a value "A" to that greatest value;

calculating the vertical foot-candle at one or more target points on the target area and assigning a value "B" thereto;

calculating the ratio of A to B for a given aiming point;

determining from the foregoing steps whether adjustments are indicated for any of the following: camera operation characteristics, camera position, camera aiming, or lighting.

27. A computerized system for evaluating the effect of lighting relative to televising of an event taking place in a target area, comprising;

a computer processor;

a memory component operably connected to the computer processor;

computer software operatively associated with the computer memory and the computer processor, the computer software:

a. storing inputted information regarding the uniformity and intensity of lighting for a given lighting system on the target area;

establishing a 3-dimensional grid that includes the target area and the location of one or more cameras;

storing inputted information regarding a camera location in the 3-dimensional grid;

storing inputted information regarding a plurality of aiming locations on the target area in the 3-dimensional grid;

calculating television foot-candles for an aiming point on the grid for a given camera based on the stored uniformity and intensity information and camera location;

calculating vertical foot-candles for the same aiming point and same camera viewing angle based the stored uniformity and intensity information and camera position;

calculating a ratio between the calculated television foot-candle and vertical foot-candle reading for the aiming point;

storing the three calculations;

utilizing the three readings to prepare a report that can be evaluated relative to televising an event at the target area.

* * * * *